United States Patent
Yasutake et al.

(10) Patent No.: US 10,659,702 B2
(45) Date of Patent: May 19, 2020

(54) IMAGE CAPTURING APPARATUS THAT MATCHES AN IMAGING RANGE WITH AN IRRIDATION RANGE

(71) Applicant: CANON KABUSHIKI KAISHA, Tokyo (JP)

(72) Inventors: Yuta Yasutake, Kawasaki (JP); Kazuma Takahata, Nagoya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/894,105

(22) Filed: Feb. 12, 2018

(65) Prior Publication Data
US 2019/0068892 A1    Feb. 28, 2019

(30) Foreign Application Priority Data

Aug. 25, 2017 (JP) ................. 2017-161800

(51) Int. Cl.
 *H04N 5/247* (2006.01)
 *H04N 5/225* (2006.01)
 *H04N 5/235* (2006.01)
 *H04N 5/232* (2006.01)

(52) U.S. Cl.
 CPC ........... *H04N 5/247* (2013.01); *H04N 5/2252* (2013.01); *H04N 5/2253* (2013.01); *H04N 5/2254* (2013.01); *H04N 5/2256* (2013.01); *H04N 5/2258* (2013.01); *H04N 5/2354* (2013.01); *H04N 5/23296* (2013.01)

(58) Field of Classification Search
 CPC .... H04N 5/247; H04N 5/2252; H04N 5/2253; H04N 5/2254; H04N 5/2256; H04N 5/2258; H04N 5/23296; H04N 5/2354
 See application file for complete search history.

(56) References Cited

U.S. PATENT DOCUMENTS

| | | | | |
|---|---|---|---|---|
| 2010/0128123 A1* | 5/2010 | DiPoala | ........... | G08B 13/19619 348/143 |
| 2014/0111608 A1* | 4/2014 | Pfeil | .................. | H04N 5/23238 348/37 |
| 2014/0168443 A1 | 6/2014 | Aguilar et al. | | |
| 2016/0248972 A1 | 8/2016 | Garrison et al. | | |
| 2016/0352982 A1* | 12/2016 | Weaver | ............. | H04N 5/23238 |
| 2017/0295324 A1* | 10/2017 | Cabral | ............... | H04N 5/23238 |

FOREIGN PATENT DOCUMENTS

| | | |
|---|---|---|
| CN | 101000448 A | 7/2007 |
| CN | 201181381 Y | 1/2009 |
| CN | 101587060 A | 11/2009 |
| CN | 103356167 A | 10/2013 |
| CN | 105358892 A | 2/2016 |
| CN | 207897049 U | 9/2018 |
| JP | 2015119476 A | 6/2015 |
| WO | 2014/200398 A1 | 12/2014 |
| WO | 2017/089364 A1 | 6/2017 |

* cited by examiner

*Primary Examiner* — Nicholas G Giles
(74) *Attorney, Agent, or Firm* — Canon U.S.A., Inc. I.P. Division

(57) ABSTRACT

An image capturing apparatus includes a plurality of imaging units arranged in a circumferential manner and movable in a circumferential direction, and a plurality of illumination units arranged in such a manner that each of the plurality of illumination units corresponds to a different one of the plurality of imaging units. In a case where the plurality of imaging units moves in the circumferential direction, each of the plurality of imaging units integrally moves with a corresponding one of the plurality of illumination units.

10 Claims, 10 Drawing Sheets

IMAGE CAPTURING APPARATUS THAT MATCHES AN IMAGING RANGE WITH AN IRRIDATION RANGE

BACKGROUND OF THE INVENTION

Field of the Invention

The present invention relates to an image capturing apparatus, and more particularly to an image capturing apparatus including a plurality of imaging units arranged in a circumferential manner.

Description of the Related Art

There are multi-lens camera apparatuses capable of capturing large area images. Such a multi-lens camera apparatus is provided with plurality of imaging units arranged in a circumferential manner. In some cases, for example, a multi-lens camera apparatus includes a plurality of imaging units that is fixed so that a visual field of 360 degrees can be captured. However, an obstacle, such as a wall, may be present near the multi-lens camera apparatus depending on an installation location. In such a case, an imaging range of at east one of the imaging units may be blocked by the obstacle. Thus, a position of the imaging unit is desirably changeable at will. Japanese Patent Application Laid-Open No. 2015-119476 discusses a mechanism through which a position of an imaging unit in a multi-lens camera apparatus can be freely changeable.

In a case where a video image is captured under low-intensity illumination, such as nighttime, the video image is not clear. To that end, an illumination unit is mounted on a camera in some cases so that a clear video image can be captured in the low-intensity illumination. In a case where an illumination unit is mounted in a multi-lens camera apparatus in which the position of an imaging unit is freely changeable as discussed in Japanese Patent Application Laid-Open No. 2015-119476, an imaging range needs to be uniformly irradiated with illumination light even after the position of the imaging unit is changed to capture a good video image regardless of the position of the imaging unit.

SUMMARY OF THE INVENTION

The present invention is directed to a multi-lens camera apparatus capable of acquiring a good video image by matching an imaging range of an imaging unit and an irradiation range of illumination light even after the position of the imaging unit is changed.

According to an aspect of the present invention, an image capturing apparatus includes a plurality of imaging units arranged in a circumferential manner and movable in a circumferential direction, and a plurality of illumination units arranged in such a manner that each of the plurality of illumination units corresponds to a different one of the plurality of imaging units. In a case where the plurality of imaging units moves in the circumferential direction, each of the plurality of imaging units integrally moves with a corresponding one of the plurality of illumination units.

Further features of the present invention will become apparent from the following description of embodiments with reference to the attached drawings.

DESCRIPTION OF THE EMBODIMENTS

Figure 1:
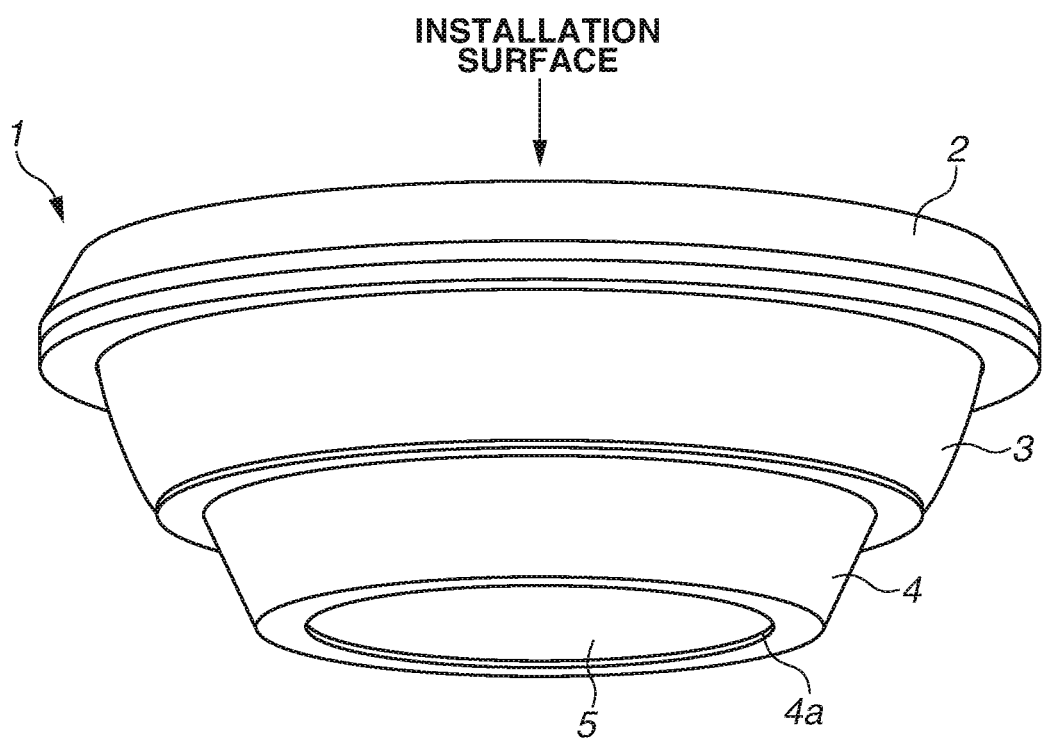
FIG. 1 is a perspective view of a multi-lens camera apparatus according to a first embodiment.

Hereinafter, embodiments are described in detail with reference to the accompanying drawings. A description of a cable and a component which are not directly related to the embodiments is omitted, and the cable and the component are not illustrated in the drawings.

A first embodiment of the present invention will be described below in detail. In the present embodiment, a multi-lens camera apparatus 1 will be described.

Figure 2:
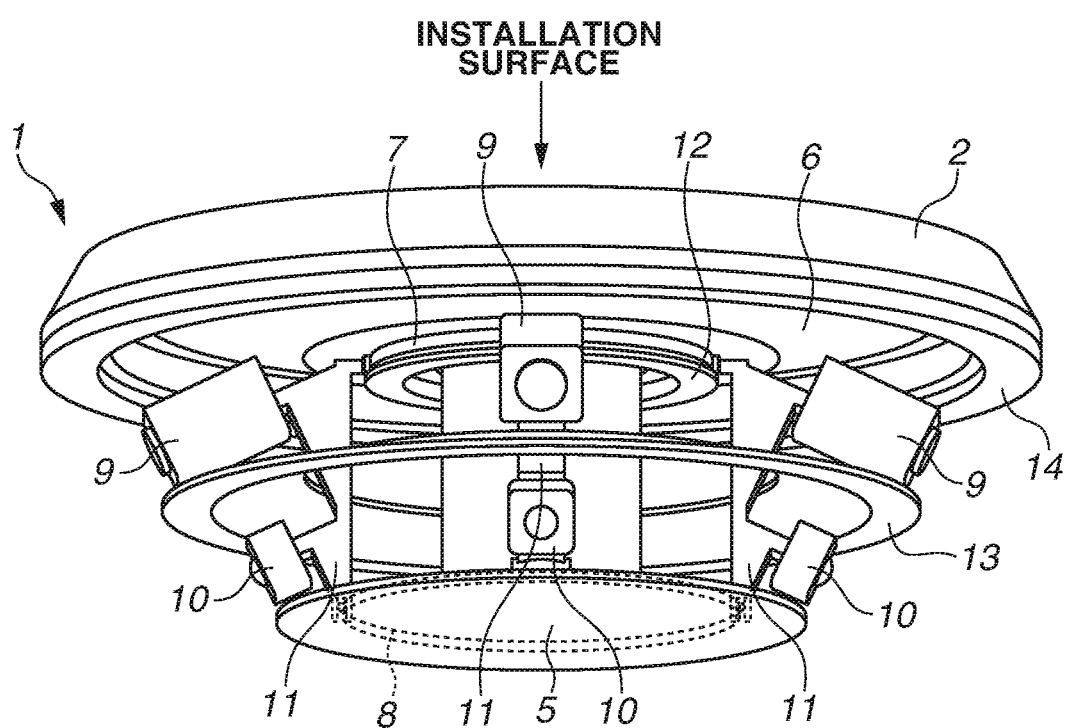
FIG. 2 is a perspective view of the multi-lens camera apparatus without a visible light transmission window and an illumination light transmission window.
Figure 3:
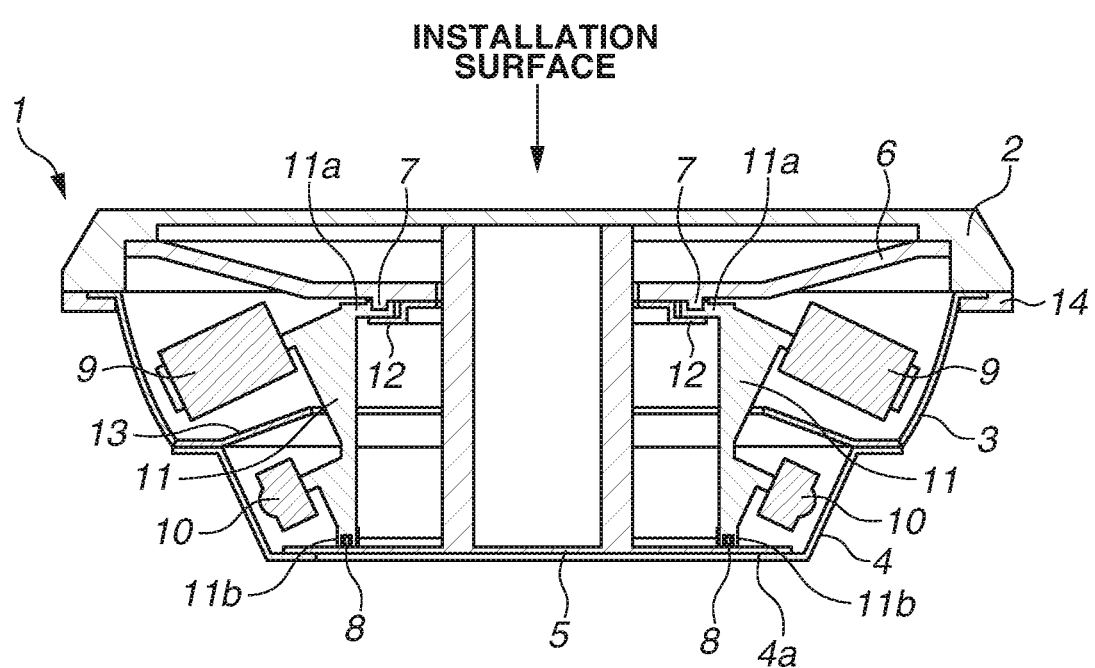
FIG. 3 is a sectional view of the multi-lens camera apparatus according to the first embodiment.

FIG. 1 is a perspective view of the multi-lens camera apparatus 1 according to the present embodiment. FIG. 2 is a perspective view of the multi-lens camera apparatus without a visible light transmission window 3 and an illumination light transmission window 4. FIG. 3 is a sectional view of the multi-lens camera apparatus 1.

The multi-lens camera apparatus 1 includes a top case 2, the visible light transmission window 3, the illumination light transmission window 4, a bottom cover 5, a plurality of imaging units 9, a plurality of illumination units 10, a plurality of holding members 11, a guide cover 12, and a light shielding wall 13.

The top case 2 is arranged on an installation surface side, and includes a multi-lens camera base 6. On the multi-lens camera base 6, a first guide 7, which is circular as one example of a guide unit, is formed. The first guide 7 is arranged on an imaging unit side. The first guide 7 may have a protrusion shape or a recessed shape.

The visible light transmission window 3 protects the imaging units 9 from raindrops, dust, and external impact. The visible light transmission window 3 is sandwiched between the top case 2 and a visible light transmission window fixing member 14. Moreover, a gasket (not illustrated) is arranged between the visible light transmission window 3 and the top case 2 to prevent intrusion of raindrops and dust into the multi-lens camera apparatus 1.

The illumination light transmission window 4 protects the illumination unit 10 from raindrops, dust, and external impact illumination light transmission window 4 is fixed to the bottom cover 5 and the light shielding wall 13 with screws (not illustrated). Moreover, gaskets (not illustrated) are arranged between the illumination light transmission window 4 and the bottom cover 5 and between the illumination light transmission window 4 and the light shielding wall 13 to prevent intrusion of raindrops and dust into the multi-lens camera apparatus 1.

The bottom cover 5 covers an opening portion 4*a*. On the bottom cover 5, a second guide 8, as one example of a guide unit, is formed in a circle. The second guide 8 is arranged on an illumination unit side. The first guide 7 and the second guide 8 are arranged opposite each other. The second guide 8 can have a protrusion shape or a recessed shape.

The imaging unit 9 includes a lens and an imaging element. The plurality of imaging units 9 is arranged in a circumferential manner and movable in a circumferential direction. The imaging unit 9 is fixed to the holding member 11.

The illumination unit 10 is an illumination which emits near-infrared light. The illumination unit 10 is fixed to the holding member 11. The illumination unit 10 is arranged on the side opposite an installation surface with respect to the imaging unit 9. Moreover, each the plurality of illumination units 10 is arranged so as to correspond to a different one of the plurality of imaging units 9.

The holding member 11 holds the imaging unit 9 and the illumination unit 10 such that they are fixed with respect to each other. The holding member 11 includes a first engagement portion 11*a* having a protrusion shape and a second engagement portion 11*b* having a recessed shape on both respective ends. The first engagement portion 11*a* is engaged with the first guide 7, and the second engagement portion 11*b* is engaged with the second guide 8. Engagement of the first guide 7 and the first engagement portion 11*a* enables an upper end portion of the holding member 11 to be supported by the first guide 7. Engagement of the second guide 8 and the second engagement portion 11*b* enables a lower end portion of the holding member 11 to be supported by the second guide 8.

This enables the holding member 11 to slide along the first guide 7 and the second guide 8, thereby integrally moving the imaging unit 9 and the illumination unit 10 together as one unit.

The guide cover 12 aids stable movement of the first engagement portion 11*a* such that the first engagement portion 11*a* is not disengaged from the first guide 7. The guide cover 12 is arranged under the first engagement portion 11*a*. The light shielding wall 13 is arranged between the imaging unit 9 and the illumination unit 10, and is a lightproof wall through which at least illumination light is not transmitted.

The light shielding wall 13 prevents or reduces illumination light that enters into the imaging unit 9 from the illumination unit 10 without going through a subject. The light shielding wall 13 may be integrally provided with the visible light transmission window 3. Alternatively, the light shielding wall 13 may be bonded to the visible light transmission window 3 by attachment, or fixed to the visible light transmission window 3 with a screw.

Figure 4:
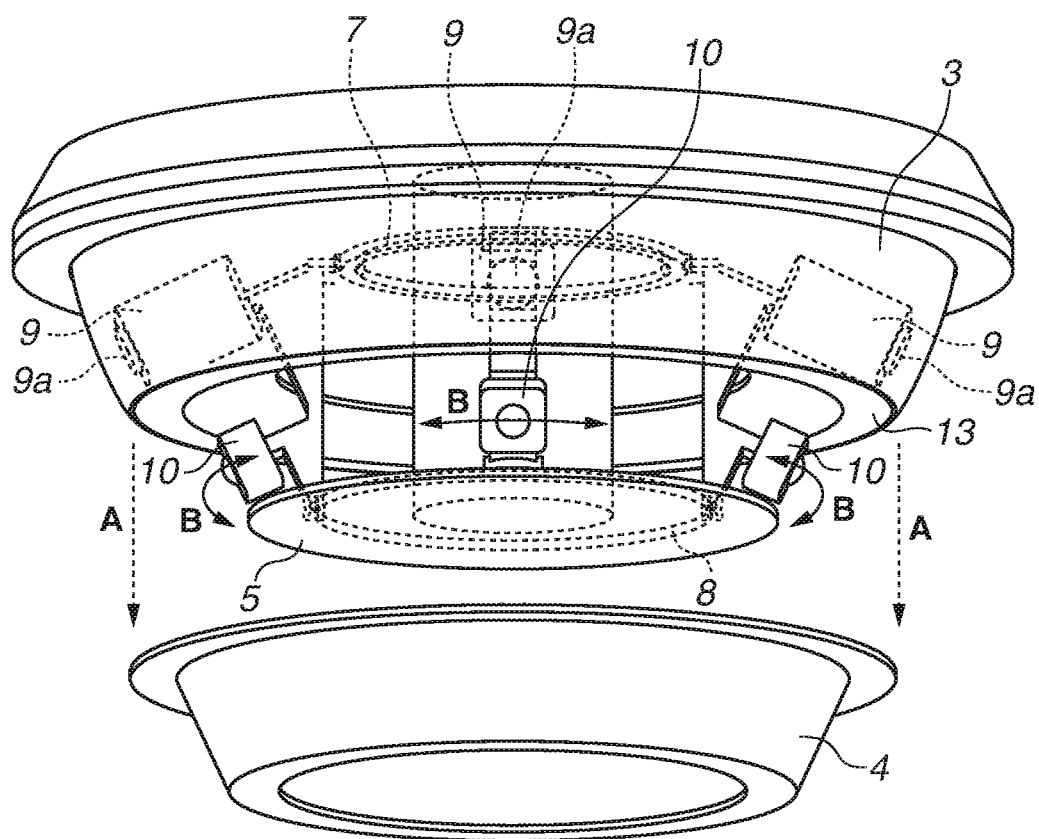
FIG. 4 is a diagram illustrating an imaging range changing method for an imaging unit in the multi-lens camera apparatus according to the first embodiment.

FIG. 4 is a diagram illustrating an imaging range changing method for the imaging unit 9. In a case where an imaging range of the imaging unit 9 is to be changed, the illumination light transmission window 4 fixed, for example, with a screw (not illustrated) is removed (in a direction indicated by an arrow A illustrated in FIG. 4). When the illumination light transmission window 4 is removed, the illumination unit 10 is exposed. Then, a user grasps and moves the illumination unit 10 to the right and left (in a direction indicated by an arrow B illustrated in FIG. 4), so that the imaging unit 9 can be integrally moved along the first guide 7 and the second guide 8. Herein, since the visible light transmission window 3 does not need to be removed or the imaging unit 9 does not need to be grasped, an imaging range of the imaging unit 9 can be changed not only by a simple work but also without making the visible light transmission window 3 and a lens 9*a* of the imaging unit 9 dirty. In the present embodiment, the user moves the illumination unit 10 to change the imaging range. However, an imaging range can be automatically changed by, for example, a remote operation.

Figure 5:
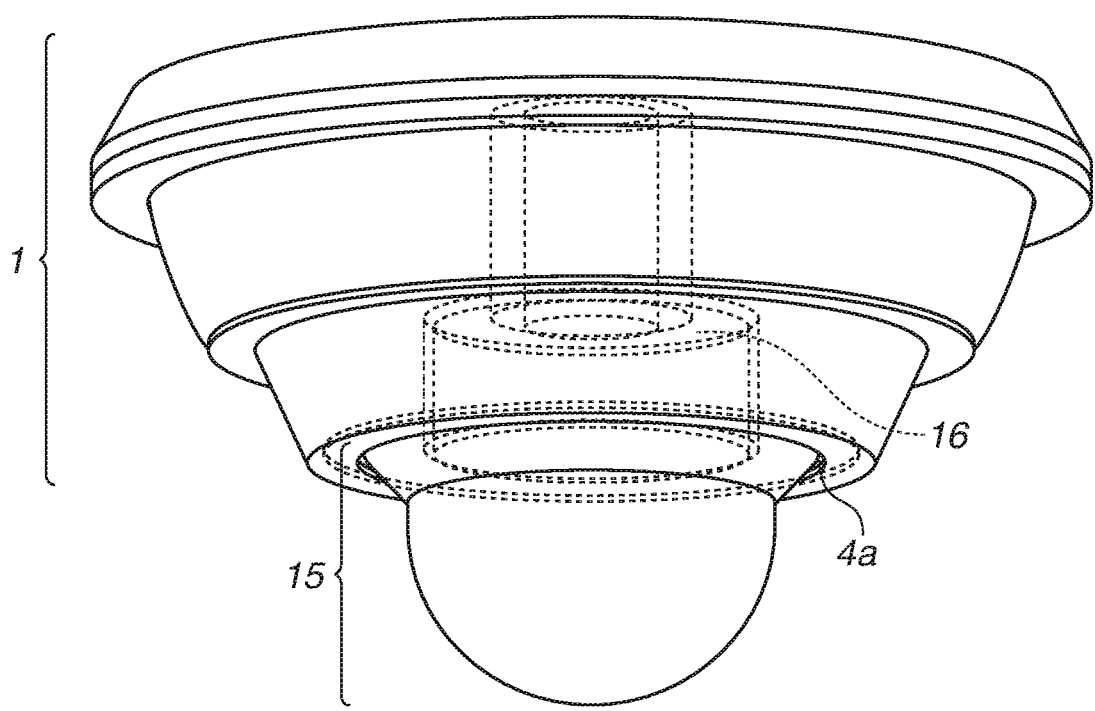
FIG. 5 is a perspective view of a case in which a pan-tilt-zoom (PTZ) camera apparatus is attached to the multi-lens camera apparatus according to the first embodiment.

FIG. 5 is a perspective view for a case in which a pan-tilt-zoom (PTZ) camera apparatus 15 is attached to the multi-lens camera apparatus a sectional view for a case in which the PTZ camera apparatus 15 is attached to the multi-lens camera apparatus 1.

Figure 6:
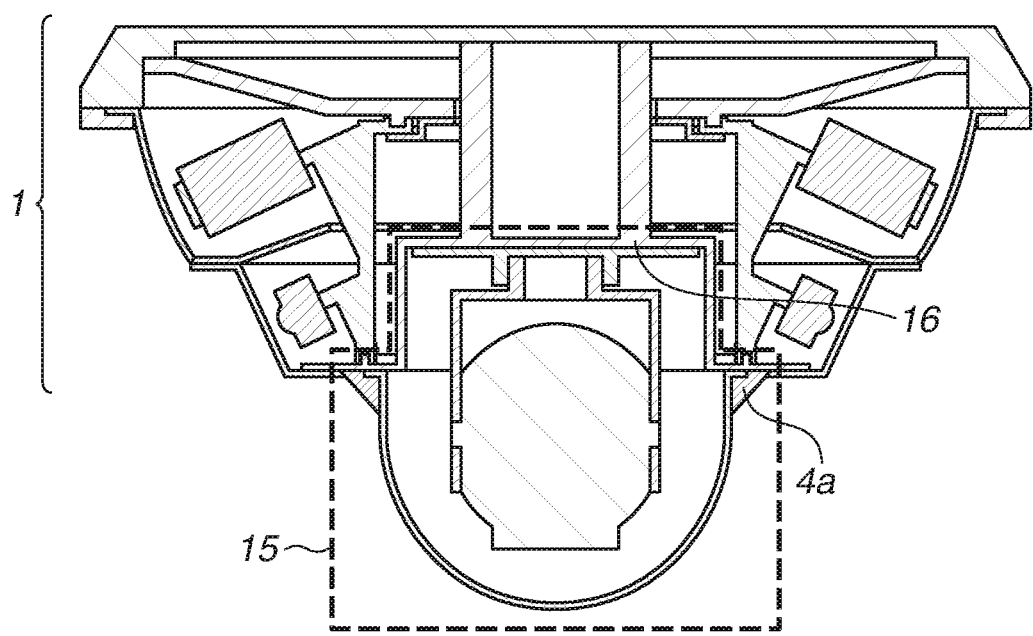
FIG. 6 is a sectional view of a case in which the PTZ camera apparatus is attached to the multi-lens camera apparatus according to the first embodiment.

The bottom cover 5 is replaceable. The bottom cover 5 can be replaced with a bottom cover 16 as illustrated in FIGS. 5 and 6.

For example, the PTZ camera apparatus 15 rotatable in a pan direction and a tilt direction is attachable to the bottom cover 16. The PTZ camera apparatus 15 is arranged in a center of the circumference where the plurality of imaging units 9 is arranged. The PTZ camera apparatus 15 protrudes from the opening portion 4*a*.

The PTZ camera apparatus 15 is oriented toward a specific target point within a video image captured by the plurality of imaging units 9, so that an object or a human being can be tracked across the entire area capturable by the PTZ camera apparatus 15.

A second embodiment of the present invention will be described in detail. In the present embodiment, a description will be provided of a multi-lens camera apparatus different from the multi-lens camera apparatus 1 described in the first embodiment. In the present embodiment, a holding method for an imaging unit and an illumination unit differs from that of the first embodiment.

Figure 7:
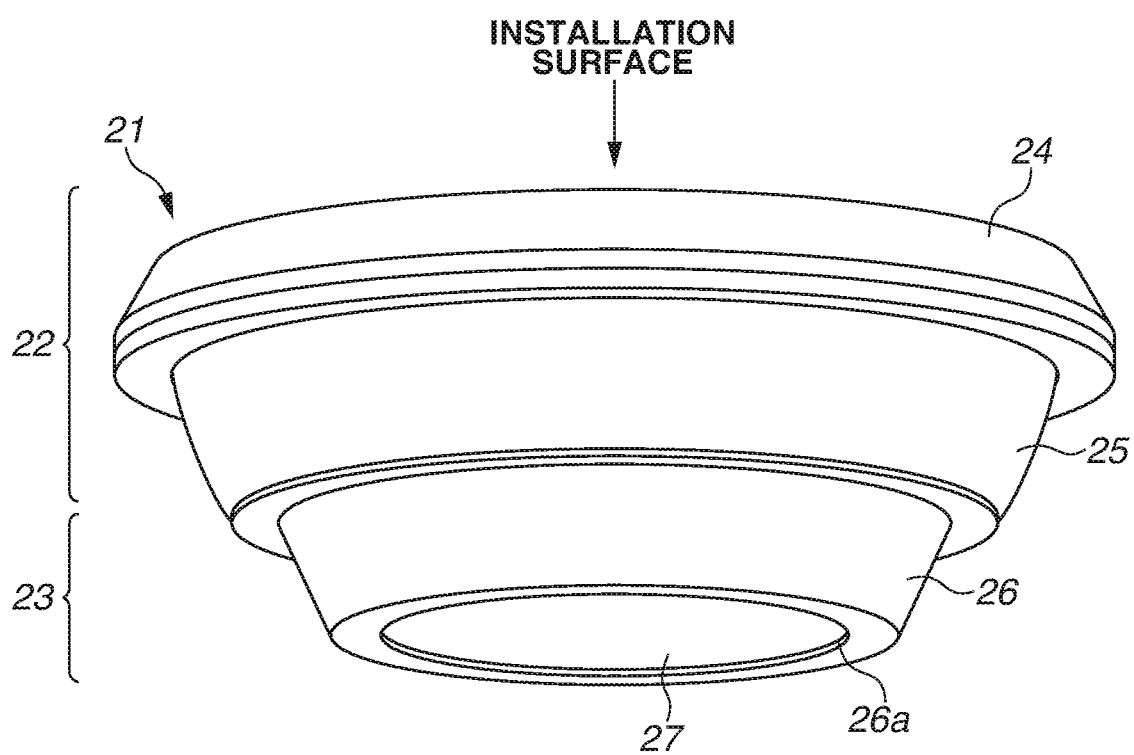
FIG. 7 is a perspective view of a multi-lens camera apparatus according to a second embodiment.
Figure 8:
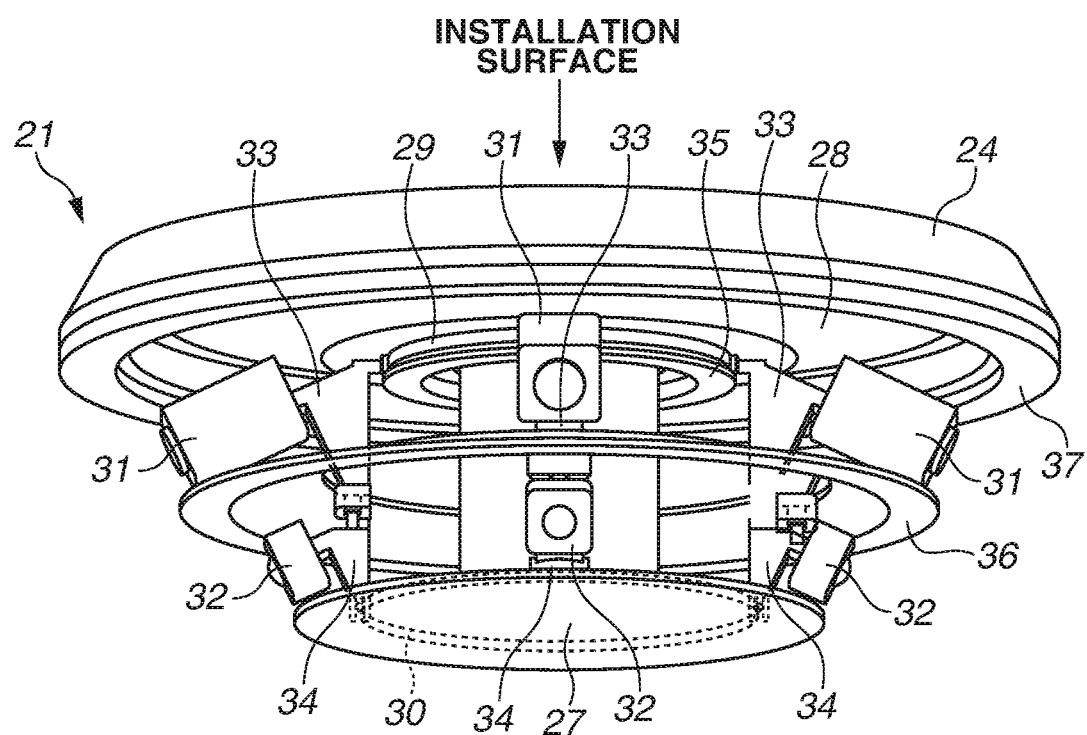
FIG. 8 is a perspective view of the multi-lens camera apparatus according to the second embodiment without a visible light transmission window and an illumination light transmission window.
Figure 9:
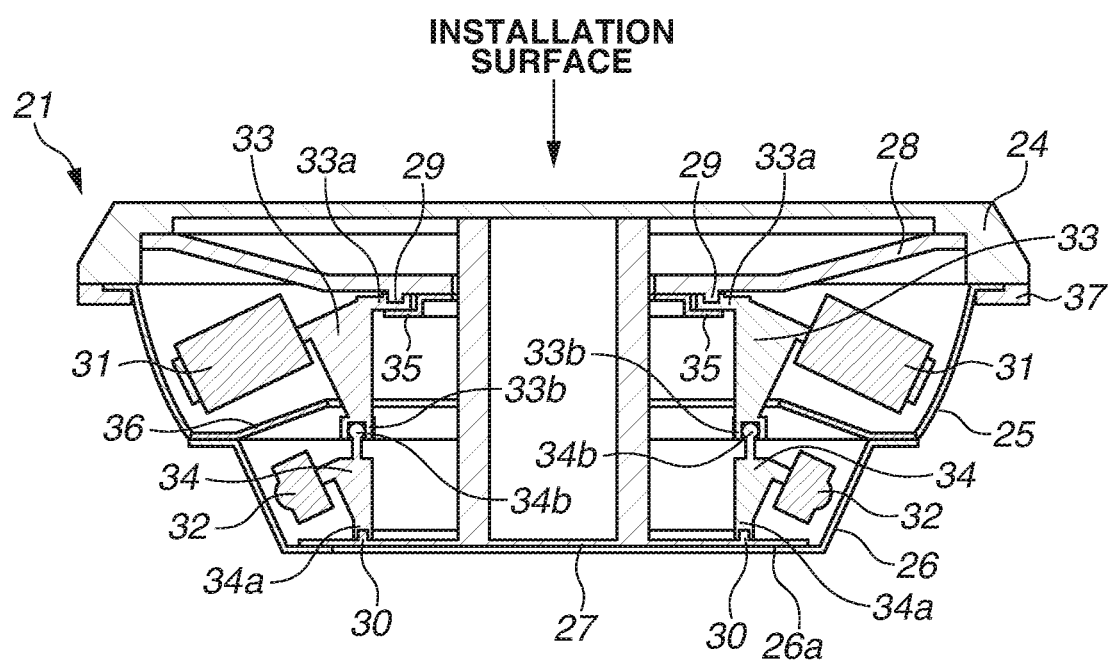
FIG. 9 is a sectional view of the multi-lens camera apparatus according to the second embodiment.

FIG. 7 is a perspective view of the multi-lens camera apparatus 21 according to the present embodiment. FIG. 8 is a perspective view of the multi-lens camera apparatus 21 without a visible light transmission window 25 and an illumination light transmission window 26. FIG. 9 is a sectional view of the multi-lens camera apparatus 21.

The multi-lens camera apparatus 21 includes a multi-lens camera unit 22 and an attachable and detachable illumination unit 23.

The multi-lens camera apparatus 21 includes a top case 24, the visible light transmission window 25 through which at least visible light is transmitted, the illumination light transmission window 26 through which at least illumination light is transmitted, and a bottom cover 27 which covers an opening portion 26*a* provided on the illumination light transmission window 26. Moreover, the multi-lens camera apparatus 21 includes a plurality of imaging units 31, a plurality of illumination units 32, a plurality of imaging unit holding members 33, a plurality of illumination unit holding members 34, a guide cover 35, and a light shielding wall 36.

A top case 24 is arranged on an installation surface side, and includes a multi-lens camera base 28. On the multi-lens camera base 28, a circular imaging unit guide 29 is formed. The imaging unit guide 29 may have a protrusion shape or a recessed shape.

The visible light transmission window 25 protects the imaging unit 31 from raindrops, dust, and external impact. The visible light transmission window 25 is sandwiched between the top case 24 and a visible light transmission window fixing member 37. Moreover, a gasket (not illustrated) is arranged between the visible light transmission window 25 and the top case 24 to prevent intrusion of raindrops and dust into the multi-lens camera apparatus 21.

The illumination light transmission window 26 protects the illumination unit 32 from raindrops, dust, and external impact. The illumination light transmission window 26 is fixed to the bottom cover 27 and the light shielding wall 36 with, for example, screws (not illustrated). Moreover, gaskets (not illustrated) are provided between the illumination light transmission window 26 and the bottom cover 27 and between the illumination light transmission window 26 and the light shielding wall to protect intrusion of raindrops and dust into the multi-lens camera apparatus 21.

The bottom cover 27 covers the opening portion 26a. On the bottom cover 27, an illumination unit guide 30 is formed in a circle. The imaging unit guide 29 and the illumination unit guide 30 are arranged opposite each other. The illumination guide 30 can have a protrusion shape or a recessed shape.

The imaging unit 31 includes a lens and an imaging element. A plurality of imaging units 31 is arranged in a circumferential manner and is movable in a circumferential direction. The imaging unit 31 is fixed to the imaging unit holding member 33.

The imaging unit holding member 33 holds the imaging unit 31. The imaging unit holding member 33 includes an engagement portion 33a which engages the imaging unit guide 29, and a connection structure portion 33b having a hole with a square bottom to which the illumination unit holding member 34 connects.

The illumination unit 32 is an illumination which emits near-infrared light. The illumination unit 32 is fixed to the illumination unit holding member 34. The illumination unit 32 is arranged on the side opposite an installation surface with respect to the imaging unit 31.

The illumination unit holding member 34 holds the illumination unit 32. The illumination unit holding member includes an engagement portion 34a, which engages the illumination unit guide 30, and a spherical-shaped connection structure portion 34b which is connected to the imaging unit holding member 33.

The imaging unit holding member 33 is movable along the imaging unit guide 29 by the engagement portion 33a. The illumination unit holding member 34 is movable along the illumination unit guide 30 by the engagement portion 34a. The connection structure portion 34b is supported by the connection structure portion 33b. This configuration enables the imaging unit holding member 33 and the illumination unit holding member 34 to integrally slide along the imaging unit guide 29 and the illumination unit guide 30, thus integrally moving the imaging unit 31 and the illumination unit 32.

The guide cover 35 aids stable movement of the engagement portion 33a in such a manner that the engagement portion 33a is not disengaged from the imaging unit guide 29. The guide cover 35 is arranged under the engagement portion 33a.

The light shielding wall 36 reduces or prevents illumination light that enters into the imaging unit 31 from the illumination unit 32 without going through a subject. The light shielding wall 36 can be integrally provided with the visible light transmission window 25. Alternatively, the light shielding wall 36 can be bonded to the visible light transmission window 25 by attachment, or fixed to the visible light transmission window 25 with a screw.

Figure 10:
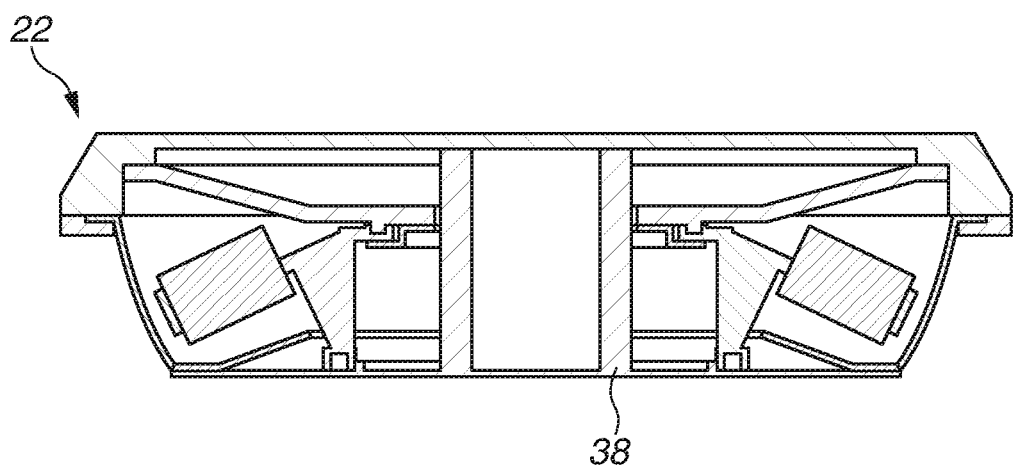
FIG. 10 is a sectional view for a case in which an illumination unit is not mounted on the multi-lens camera apparatus according to the second embodiment.

FIG. 10 is a sectional view for a case in which an illumination is not provided to the multi-lens camera apparatus 21. Making the illumination unit 23 attachable and detachable enables a user who does not need an illumination to use only the multi-lens camera unit 22 with use of a button cover 38 as illustrated in FIG. 10. Although the embodiments have been described, the present invention is not limited to each of the embodiments, and various modification and changes can be possible within a scope of the invention.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-161800, filed Aug. 25, 2017, which is hereby incorporated by reference herein in its entirety.

What is claimed is:

1. An image capturing apparatus comprising:
   a first imaging portion;
   a second imaging portion;
   a first illumination portion;
   a second illumination portion;
   a first holding portion configured to hold the first imaging portion;
   a second holding portion configured to hold the second imaging portion;
   a third holding portion configured to hold the first illumination portion;
   a fourth holding portion configured to hold the second illumination portion;
   an imaging portion guide, being circular, configured to guide the first holding portion and the second holding portion in a circumferential direction; and
   an illumination portion guide, being circular, configured to guide the third holding portion and the fourth holding portion in the circumferential direction.

2. The image capturing apparatus according to claim 1,
   wherein the imaging portion guide is arranged closer to the first imaging portion and the second imaging portion than the first illumination portion and the second illumination portion; and
   wherein the illumination portion guide is arranged closer to the first illumination portion and the second illumination portion than the first imaging portion and the second imaging portion.

3. The image capturing apparatus according to claim 1,
   wherein the first holding portion and the third holding portion are connected to each other,
   wherein the second holding portion and the fourth holding portion are connected to each other.

4. The image capturing apparatus according to claim 3, wherein the third holding portion is detachable from the first holding portion.

5. The image capturing apparatus according to claim 1, wherein the first imaging portion and the first illumination portion is located at substantially the same circumferential position.

6. The image capturing apparatus according to claim 1, wherein the first illumination portion is arranged in a plane further from an installation surface than a plane in which the first imaging portion is arranged.

7. The image capturing apparatus according to claim 1, further comprising a light shielding wall arranged between the first imaging portion and the first illumination portion.

8. The image capturing apparatus according to claim 1, further comprising an illumination light transmission window covering the first illumination portion and the second illumination portion, and configured to transmit illumination light emitted from the first illumination portion and the second illumination portion,
   wherein the illumination light transmission window is removable, and
   wherein the first illumination portion is exposed when the illumination light transmission window is removed, and the first imaging portion and the first illumination portion integrally move in a case where the exposed first illumination portion is moved.

9. The image capturing apparatus according to claim 1, further comprising another imaging portion arranged in a center of a circumference where the first imaging portion and the second imaging portion is arranged in the circumferential manner, the imaging portion being rotatable in a pan direction and a tilt direction.

10. The image capturing apparatus according to claim 1, wherein the first illumination portion and the second illumination portion each emits near-infrared light.

\* \* \* \* \*